July 12, 1932. O. F. ROHWEDDER 1,867,377
MACHINE FOR SLICING AN ENTIRE LOAF OF BREAD AT A SINGLE OPERATION
Filed Nov. 26, 1928 3 Sheets-Sheet 1
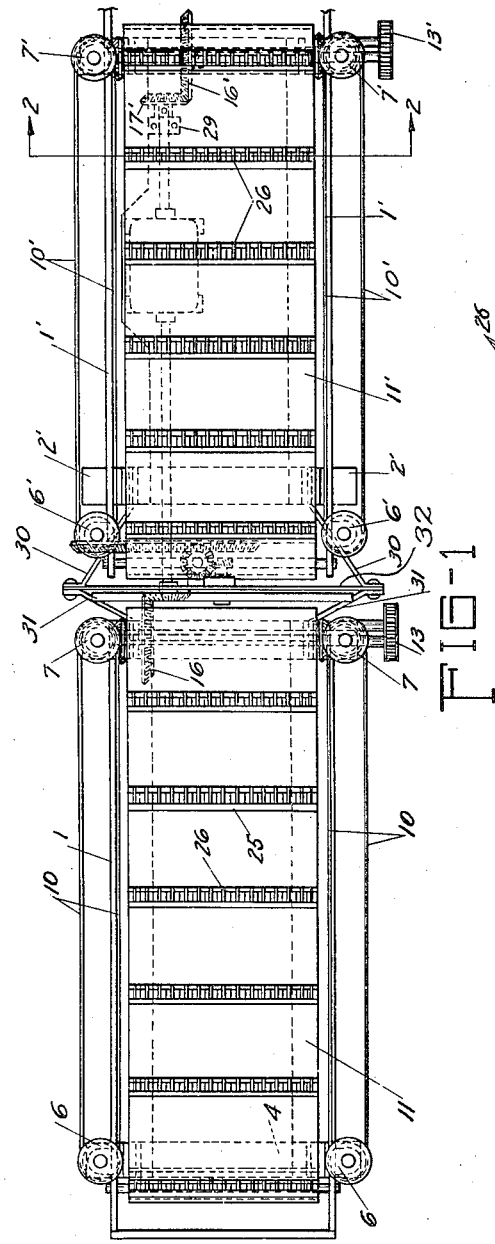
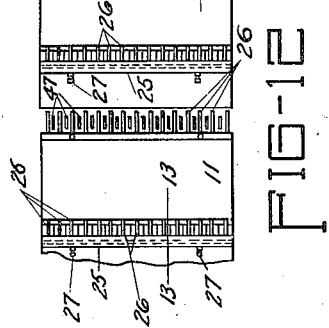
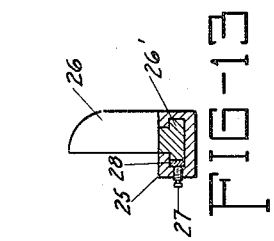
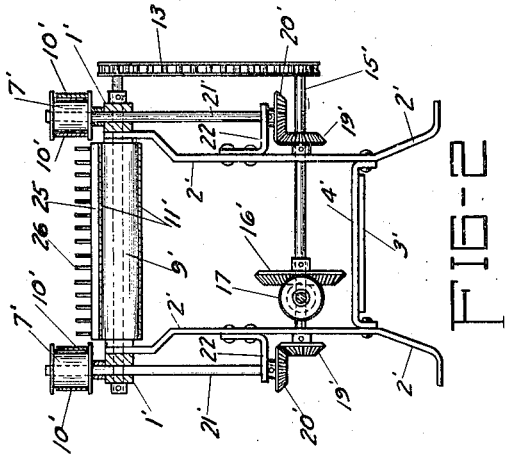
Otto F. Rohwedder INVENTOR.
BY
Curtis Bush ATTORNEY

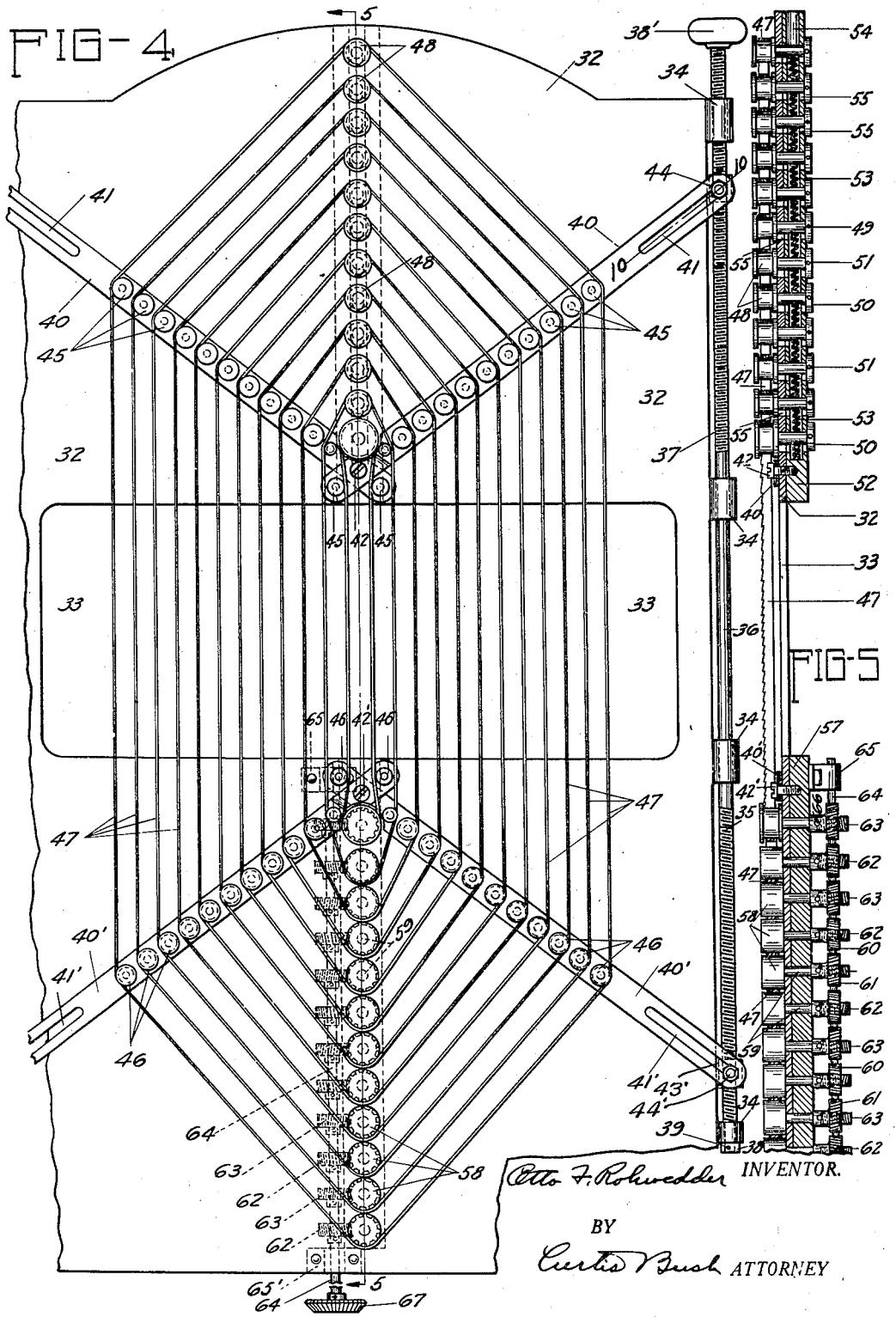

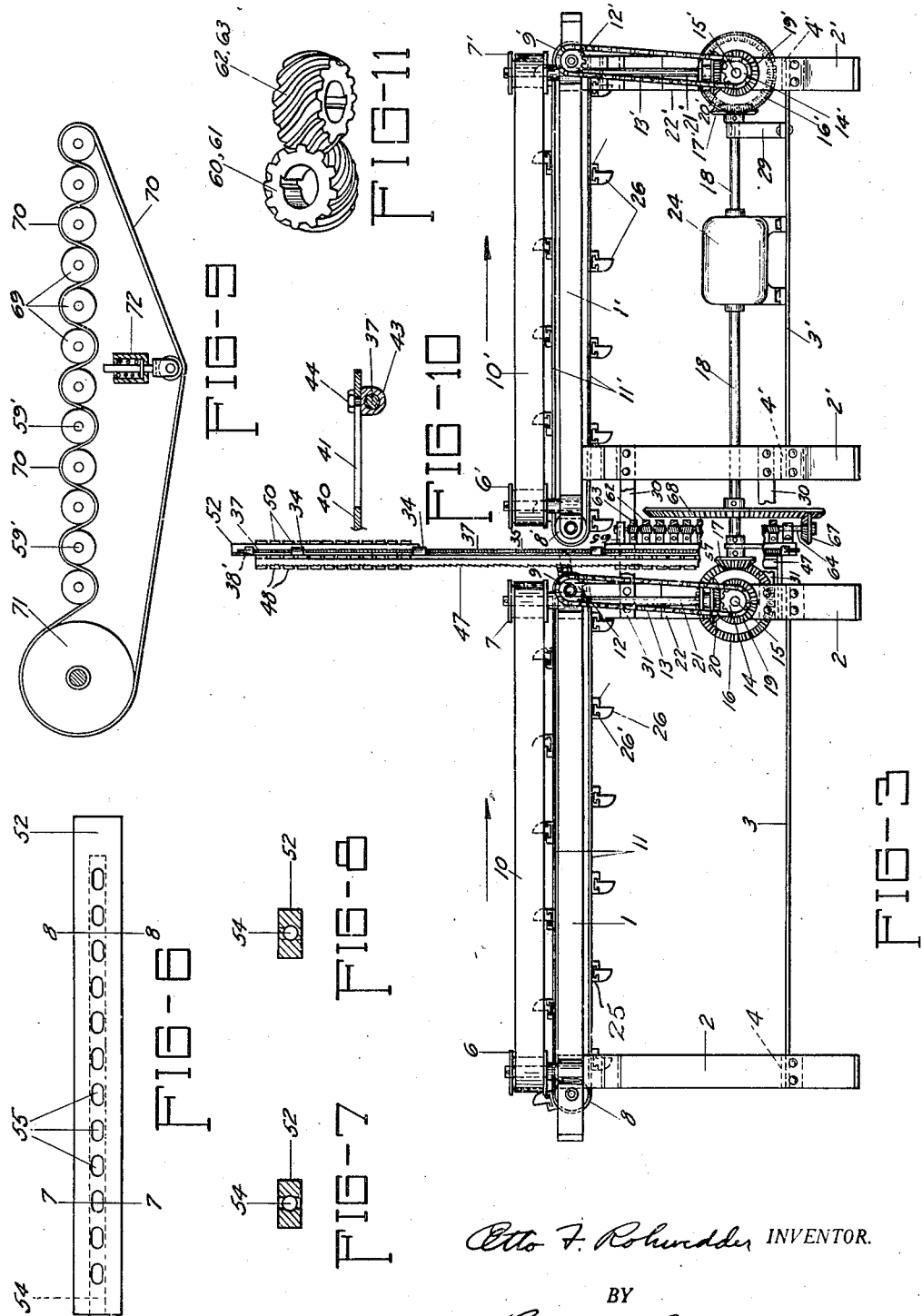

Patented July 12, 1932

1,867,377

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

MACHINE FOR SLICING AN ENTIRE LOAF OF BREAD AT A SINGLE OPERATION

Application filed November 26, 1928. Serial No. 321,921.

This invention relates to bread slicing machines and particularly to machines for slicing an entire loaf of baked bread in a single operation.

One of the objects of the present invention is to provide a new and improved machine for slicing bread which embodies a plurality of continuous cutting bands.

Another object is to provide means in a slicing machine having a plurality of continuous cutting bands for maintaining a substantially uniform tension in the cutting bands.

Another object is to provide a slicing machine having a plurality of continuous cutting bands with improved means for simultaneously changing the spacing between the bands.

Another object is to provide a bread slicing machine having a plurality of endless cutting bands with means for driving adjacent bands in opposite directions.

A further object is to provide a bread slicing machine having a plurality of endless cutting bands with means for moving the bread to and through the cutting bands.

A further object is to provide a bread slicing machine with a plurality of endless slicing bands arranged with their cutting edges in the same vertical planes.

A still further object is to provide a bread slicing machine having a plurality of endless cutting bands with means for receiving the sliced bread from the bands which is particularly adapted to cooperate with a bread wrapping machine.

With the above and other objects in view, the present invention may be said to comprise the apparatus as illustrated in the accompanying drawings, hereinafter described and particularly set forth in the appended claims, together with such variations and modifications thereof as will be apparent to one skilled in the art to which the invention appertains.

In the drawings which illustrate a suitable embodiment of the present invention, Figure 1 is a plan view of the bread slicing machine showing the means for delivering the bread to the slicing apparatus and the means for receiving the sliced bread from the slicing apparatus.

Fig. 2 is a transverse section taken on the line 2—2 of Fig. 1 showing the means for driving the delivery conveyor.

Fig. 3 is a side elevation of the slicing machine shown in Fig. 1 showing the general arrangement of the cooperating parts.

Fig. 4 is an enlarged front elevation of the slicing apparatus showing the means for guiding and driving the cutting bands.

Fig. 5 is a section taken on the line 5—5 of Fig. 4 showing the arrangement of the driving rollers for the cutting bands.

Fig. 6 is an enlarged plan view of the bar which supports the band idler pulleys.

Fig. 7 is a transverse section taken on the line 7—7 of Fig. 6.

Fig. 8 is a transverse section taken on the line 8—8 of Fig. 6.

Fig. 9 is a partially diagrammatic view of a modified driving means for the band driving rollers.

Fig. 10 is a longitudinal section taken on the line 10—10 of Fig. 4 showing the means for attaching the band adjusting lever to the adjusting screw.

Fig. 11 is an enlarged perspective view of the spiral bevel gears for driving the band rollers.

Fig. 12 is a partial plan view of the adjacent ends of the feed and delivery conveyors, showing the same positioned at each side of the cutting bands and showing the conveyor fingers extending between and beyond the cutting bands.

Fig. 13 is a transverse section taken on the line 13—13 of Fig. 12 showing the adjustable means for securing the feeding fingers to the transverse cover cleat.

Fig. 14 is a front elevation of one of the driving fingers.

The slicing machine in general comprises a plurality of endless cutting bands arranged with their cutting edges in the same vertical plane so that the cutting edges simultaneously engage the loaf of bread fed thereto. These bands are so operated that adjacent bands move in opposite directions to prevent crushing and displacement of the bread slices as they are being moved through the cutting bands. The slicing machine also comprises a feed conveyor for feeding the unsliced bread to the slicing apparatus and a delivery conveyor for receiving the sliced bread from the slicing apparatus, which delivery conveyor is particularly adapted to cooperate with a bread wrapping machine.

The cutting or slicing unit of the present invention is supported by a flat vertical back plate 32 having a central rectangular shaped opening 33 through which the bread passes as it is moved through the slicing blades. As shown in Figs. 4 and 5, the endless slicing bands 47 are arranged in spaced parallel relationship and pass over a series of upper vertically aligned idler rollers 48, adjusting rollers 45 and 46 which will be later described, and a plurality of lower spaced driving rollers 58. These cutting bands 47 are preferably of relatively thin, high grade spring steel having one edge ground to a knife edge which may be either plane or undulating as desired. The upper idler rollers 48 are preferably provided with flanges to prevent the bands 47 from sliding from the same and are provided with the shaft portions 49 which extend through vertical slots 55 in the back plate 32. The shaft portions also extend through corresponding openings 55 provided in a supporting bar 52 which is secured to the rear face of the back plate 32. The roller shafts 49 extend beyond the supporting bar 52 and are held against axial movement by collars 50 which are secured thereto by suitable pins 51. The supporting bar 52 is provided with a central longitudinal opening 54 extending from its upper end to approximately its lower end and a plurality of coil springs 53 are positioned therein between the shaft portions 49 of the idler rollers 48 and between the lowermost shaft 49 and the bottom of the longitudinal opening 54. These springs 53 function to maintain a uniform tension in the cutting bands 47.

A similar retaining bar 57 is secured to the lower end of the back plate 32 below the opening 33 and is provided with vertically aligned openings corresponding with similar openings in the back plate 32, which openings are arranged in the same vertical line as the openings 55 in the upper end of the back plate 32 just described. The shaft portions 59 of the lower driving rollers 58 extend through these openings and are provided at their rearward ends, which extend beyond the retaining bar 57, with suitable spiral bevel driving pinions 60 and 61 which are rigidly secured thereto by pins 66. A left-hand pinion 61 is secured to one shaft 59 and a right-hand pinion 60 is secured to the next adjacent shafts 59 so that adjacent driving rollers 58 can be driven in opposite directions. As shown in Fig. 4, the drive rollers 58 are spaced apart so that the band 47 carried by each roller engages the next adjacent roller. Since adjacent rollers operate in opposite directions a positive double drive is thereby provided for each of the bands 47 to prevent slipping of the same. The specific driving means for the rollers 58 will be later described in the specification.

The cutting bands 47 are arranged to pass over spaced upper guide rollers 45 and spaced lower guide rollers 46 which hold the same in spaced relationship. The upper rollers 45 are rotatably mounted upon a pair of upper arms 40 which are pivoted by means of a pin or screw 42 to the back plate 32 substantially on the vertical axis of the back plate 32, which axis passes through the center lines of the upper tension rollers 48 and the lower driving rollers 58. As shown in Fig. 4, the upper arms 40 diverge upwardly from the center of the back plate and are provided at their outer ends with longitudinal slots 41 and are secured to screw followers 43 by means of bolts 44 which extend through the slots 41.

The lower guide rollers 46 are provided with suitable side flanges to hold the bands in place thereon and are rotatably secured to a pair of lower arms 40' which are pivoted in the same manner as the upper arms 40 by a screw 42' to the back plate 32. These lower arms are also provided with slots 41' at their outer ends and with screw followers 43' which are secured thereto by means of bolts 44' that extend through the slots 41'.

A vertical rod 36 is rotatably mounted in bearings 34 at each side of the black plate 32, its upper end being provided with right hand threads 37 which threadably receive the screw block 43, and its lower end being provided with left-hand threads 35 which threadably receive the lower screw block 40'. Axial movement of the rod in the bearings is prevented by a collar 38 which is secured to the lower end of the screw 36 by a suitable pin 39, and a shoulder formed at the end of the rod 36. A knob or handle 38' is secured to the upper end of the screw so that the screw 36 can be turned. It is clearly obvious that by turning the screw 36 in one direction the action of the threads 35 and 37 will cause the arms 40 and 40' to move toward each other and increase the spacing between the bands 47. It is also obvious that by turning the screw 36 in the other direction the arms 40 and 40' will move away from each other about their pivot pins 42 and 42', respectively, and thereby decrease the distance between the cutting bands 47. Each screw 36 controls the upper and lower idlers 45 and 46 for the bands 47 at the adjacent side of the central axis of the back plate 32. The idler guides 45 and 46, being spaced outwardly from the rollers 48 and the drive rollers 58, provide means for increasing the angle between the bands as they pass over these rollers to decrease the contact area between bands and rollers and thereby prevent breakage of the bands 47. The innermost band 47 is preferably passed over flanged rollers of somewhat larger diameter than rollers 48 and 58 to prevent breakage. The guide rollers for this inner band are mounted on the extreme ends of the arms 40 and 40' beyond the pivot points thereof, as shown in Fig. 4.

The drive pinions 60 and 61 are driven by corresponding gears 62 and 63 that are arranged upon a vertical shaft 64 which is journaled in brackets 65 and 65' that are secured to the lowermost retaining bar 57. This shaft 64 is provided with a bevel gear 67 at its lower end which is driven by the mechanism which drives the feed and delivery conveyors.

The feed and delivery conveyors are of similar construction and since they are of similar construction the feed conveyor only will be described in detail. The delivery conveyor carries the same numbers as the feed conveyor with the exception that a prime (') is added thereto.

The delivery conveyor comprises side frames 1 which are mounted upon suitable legs 2 that are held in spaced relationship by separators 4. The separators 4 for each pair of legs are interconnected by a spreader member 3. A feed belt 11 of any suitable material is mounted upon front and rear transversely mounted rollers 8 and 9, respectively. The ends of these rollers are rotatably journaled in the side members 1.

A plurality of spaced cleats 25 are secured to the feed belt 11 and are provided with longitudinal grooves to receive a plurality of fingers 26. The fingers 26 are provided with guide tongues 26' which are received in the cleats 25. These fingers are held in place in the grooves by a longitudinal pressure bar 28 which is clamped against the tongues 26' by means of suitable set screws 27. When the set screws 27 are tightened the pressure of the bars 28 upon the tongues 26' locks the fingers 26 in place. By loosening the set screws 27 the fingers 26 can be adjusted to correspond with the spacing of the cutting bands 47. These fingers, when the slicing machine is in operation, abut against the bread being fed to the slicing bands 47 and extend between the bands 47 to force the sliced bread onto the delivery conveyor belt. The bread, as it is fed to the cutting bands 47, is centrally positioned on the conveyor belt 11 by means of a pair of spaced side belts 10 which are carried by vertically arranged flanged pulleys 6 and 7.

The feed conveyor belt 11 is driven by means of sprockets 12 carried by the shafts which support the rollers 9. These sprockets 12 are driven from second sprockets 14 carried by a transversely arranged shaft 15 by means of interconnecting sprocket chains 13. The vertical shaft 21 for the pulleys 7 which drive the side belts 10 and which are bearinged in suitable brackets 22, are rotated by means of bevel gears 20 secured to their lower ends, which mesh with similar bevel gears 19 also carried by the horizontal shaft 15.

The conveyor belt 11' and side belts 10' for the delivery conveyor are also driven in the same manner from a similar horizontal shaft 15'.

The feed and delivery conveyors are longitudinally aligned with their adjacent ends positioned close to the cutting mechanism, so that when the fingers 26 of the feed and delivery belts are in operation they may pass between the cutting blades 47. The slicing mechanism is supported by suitable brackets 30 and 31 that are attached to the back plate 32 and the legs 2 and 2', respectively, of the feed and delivery conveyors.

The shafts 15 and 15' are provided with bevel gears 16 and 16', respectively, which mesh with bevel pinions 17 and 17'. These pinions 17 and 17' are carried by a longitudinally extending shaft 18 which is driven by a suitable motor 24. The motor 24 is preferably supported by the member 3' and the shafts 18 are preferably supported at their ends by suitable journal brackets 29.

The shaft 18 adjacent the slicing mechanism carries a large bevel gear 68 that meshes with and drives the bevel pinion which drives the slicing bands 47.

The feed and delivery conveyors and the slicing machine are thus driven by the same means, but are so arranged and timed that the conveyors operate at a speed relatively slower than the slicing mechanism.

If desired, the faces of the rollers and pulleys which engage the cutting bands, may be slightly cone-shaped so as to prevent the cutting edges of the bands from contacting with the flanges thereof, where such are provided.

In the operation of the slicing machine the bread is fed to the feed belt 11 in any suitable manner and is deposited thereon in front of the rows of spaced fingers 26 in abutting relationship. As the fingers 26 carry the bread forward, the loaves are centered on the conveyor belt in the correct position and moved through the cutting blades 47 and sliced. The fingers 26 move between the cutting bands and discharge the sliced loaf onto the delivery belt 11' between the side belts which hold the slices in abutting relationship. The fingers 26 on the delivery belt engage the sliced loaf and carry the same to the delivery end.

The delivery belt 11' and side belts 10' may be the portion of a wrapping machine which feeds the bread to the wrapper, in which case the side belts 10' hold the slices in substantial loaf form until the wrapping machine places a suitable wrapper around the same.

When it is desired to change the adjustment of the cutting bands to obtain thicker slices, the adjustment arms 40 and 40' are actuated toward each other by turning the adjusting screws 36. Also when it is desired to obtain thinner slices the arms 40 and 40' are actuated away from each other. In case a substantial change is made in the spacing of the slicing bands 47, the adjustment of the fingers 26 on the feed and delivery conveyor belts is accomplished by loosening the set screws 27, and moving the fingers longitudinally in the cleats 25 to the correct position, after which they are locked by tightening the screws 27.

A modified means for driving the band driving pulleys 58 is shown in Fig. 9 to comprise a plurality of pulleys 69 mounted on the shafts 59', which replace the right and left-hand bevel pinions 60 and 61. A suitable drive pulley 71 is arranged on the drive shaft 18 which carries a driving belt 70. The belt 70, as shown, passes over one side of one pulley and over the other side of the next adjacent pulley 69 so that the pulleys are driven in opposite directions. A suitable tension in the belt 70 may be provided for by the tensioning device 72.

It is to be noted that a new and novel method of arranging a plurality of continuous band saws so that the cutting edges are in alignment and so that adjacent bands will move in opposite directions, is provided,— a feature which has never been accomplished heretofore.

It is obvious that the present invention provides a novel and simple means for adjusting the spacing between a plurality of band saw blades.

It is also to be noted that with the arrangement of the continuous bands described, the pulleys and rollers may be of considerably larger diameter than the spacing of the bands, to thereby avoid the sharp band incident to a small drive pulley.

It is furthermore obvious that the arrangement of the idler guide pulleys allows the bands to pass from the drive pulleys in oblique lines to increase the angle between opposite sides of the bands and thereby reduce the danger of breakage of the bands.

It is clearly apparent that by providing a plurality of continuous bands and moving the same at relatively high speeds in opposite directions, the speed of slicing complete loaves of bread will be materially increased.

Furthermore, it is to be understood that the particular form of slicing machine shown and described, and the particular method set forth, are presented for purposes of explanation and illustration and that various modifications may be made from said invention without departing from the spirit and scope of my invention.

What I claim is:—

1. In a bread slicing machine having a frame and a series of continuous cutting bands mounted thereon, an adjusting mechanism comprising a plurality of arms pivoted at one end to the frame, a series of guides mounted upon each arm adjacent to and bearing upon the cutting bands, and means for varying the inclination of the arms to the vertical axis of the frame.

2. In a bread slicing machine having a frame and a series of continuous cutting bands mounted thereon, an adjusting mechanism comprising a plurality of arms pivoted at one end to the frame, a series of guides mounted upon each arm adjacent to and bearing upon the cutting bands, means for varying the inclination of the arms to the vertical axis of the frame, and resilient means for continuously maintaining the tension of the bands.

3. In a bread slicing machine having a frame and a series of continuous cutting bands mounted upon pulleys secured to the frame, an adjusting mechanism comprising upper and lower pairs of arms pivoted at one end near the middle line of the frame, one of each pair of said arms extending obliquely to the right and one of each pair extending obliquely to the left, and sloping in opposite directions, means attached to the free ends of the arms extending to the right by which they can be simultaneously moved in opposite directions and means attached to the free ends of the arms extending to the left by which they can be similarly moved, and a series of guides secured to each arm and bearing against the cutting bands.

4. In a bread slicing machine having a frame and a series of continuous cutting bands mounted upon pulleys secured to the frame, an adjusting mechanism comprising upper and lower pairs of arms pivoted at one end near the middle line of the frame, one of each pair of said arms extending obliquely to the right and one of each pair extending obliquely to the left, and sloping in opposite directions, screw followers attached to the free ends of the arms, adjusting screws extending longitudinally of the frame at each side thereof revolvably mounted in bearings united to the frame, each screw having its upper half threaded in one direction and its lower half threaded in the opposite direction, the corresponding screw followers being similarly threaded and embracing the screws respectively.

5. In a bread slicing machine, the combination with a plate-like frame having a central opening therein, of a series of drive pulleys revolvably mounted in the frame along the middle line of one end thereof and a series of idler pulleys adjustably mounted along the middle line of the opposite end thereof, a series of cutting bands mounted upon said pulleys, four adjusting arms pivoted to the plate near their inner ends and between the drive pulleys and idler pulleys with their free ends extending outwardly obliquely, a series of idler pulleys mounted upon each arm adapted to bear against the cutting bands, and means for simultaneously adjusting either the right or left pair of adjusting arms adapted to adjust the spacing of the cutting bands.

6. In a cutting or slicing machine employing continuous cutting bands having their cutting edges in alignment, the combination with a series of continuous cutting bands, of two corresponding series of pulleys to carry or drive said bands, secured in line upon the frame and spaced apart, additional series of guide idler-pulleys mounted upon the frame and extending obliquely and laterally at each side of the line of the first mentioned pulleys adapted to guide the cutting bands in parallel lines and in uniformly spaced relation.

7. In a cutting or slicing machine employing continuous cutting bands, the combination with a series of continuous cutting bands, of two corresponding series of pulleys to carry or drive said bands, secured in line upon the frame and spaced apart, additional series of guide idler-pulleys mounted upon the frame and extending laterally at each side of the line of the first mentioned pulleys adapted to guide the cutting bands in parallel lines in uniformly spaced relation, and means for adjusting the position of each series of guide idler-pulleys relative to the line of the first mentioned pulleys.

8. In a bread slicing machine, a series of endless cutting bands movable in one direction, a second series of endless cutting bands arranged between and having their cutting edges in substantial alignment with the bands of said first mentioned series, said second series being movable in a direction opposite to said first series, means for simultaneously and uniformly regulating the distance between all of said bands, and means for driving said first and second series in opposite directions.

9. In a bread slicing machine, a plurality of endless cutting bands having their cutting edges in substantial alignment and having adjacent bands movable in opposite directions, and a plurality of guides engageable with said bands, said guides being bodily movable to uniformly change the distance between said bands.

10. In a bread slicing machine having a plurality of endless cutting bands, each being positioned between and operatable in a direction opposite to adjacent bands, means for regulating the spacing between a number of said bands comprising a plurality of spaced guides engageable with said bands, and a common support for said guides, said support being bodily movable to simultaneously change the position of said guides.

11. In a bread slicing machine having a frame and a plurality of endless cutting bands, each being positioned between and operatable in a direction opposite to adjacent bands, means for regulating the spacing between a number of said bands comprising a plurality of spaced rollers engageable with said bands, and means for bodily moving said rollers about a common axis.

12. In a bread slicing machine having a frame and a plurality of endless cutting bands, each being positioned between and operatable in a direction opposite to adjacent bands, means for changing the spacing between said bands comprising a pair of arms pivoted at one end to said frame, a second pair of arms pivoted at one end to said frame in spaced relationship to said first pair of arms, spaced guide members mounted on each arm adjacent to and engageable with said bands, and means for varying the position of each of said arms to simultaneously and bodily move the guides thereon, whereby said guides may change the spacing between said blades.

13. In a bread slicing machine, a supporting frame, a series of aligned rollers rotatably mounted at one end of said frame, a second series of aligned rollers rotatably mounted at the other end of said frame in alignment with said first series, an endless cutting band carried by each roller of one series and a corresponding roller of the other series, each band being positioned midway between adjacent bands with its cutting edge in alignment with the cutting edges of adjacent bands, spaced guides for holding said bands in spaced relationship, and means for driving adjacent rollers and the bands carried thereby in opposite directions.

14. In a bread slicing machine, a supporting frame, a series of aligned rotatably mounted rollers at one end of said frame, a second series of aligned rotatably mounted rollers at the other end of said frame in alignment with said first series, an endless cutting band carried by each roller of one series and a corresponding roller of the other series, a plurality of guide rollers spaced laterally at each side of the common center line of said series of rollers and being engageable with said bands for holding the same in spaced relationship, and means for driving adjacent rollers and the bands carried thereby in opposite directions.

15. A bread slicing machine comprising a frame, a series of spaced driving pulleys, a series of spaced idler pulleys well spaced from said first series, all of said pulleys having their axes disposed in the same plane, an endless cutting band carried by each drive pulley and corresponding idler pulley, each band having its cutting edge in alignment with and uniformly spaced from the cutting edges of the adjacent bands, and means for driving adjacent drive pulleys and the bands carried thereby in opposite directions.

16. In a bread slicing machine, a series of individual endless cutting bands of greater lengths, the bands of greater lengths circumscribing the bands of lesser lengths, means for supporting the bands in regularly spaced relation with their continuous cutting edges in substantial alignment and substantially equally spaced whereby said edges of all said bands may simultaneously engage the loaf of bread to be sliced and whereby each band may slice the loaf in two places, and means for moving adjacent cutting bands in opposite directions.

In testimony whereof he affixes his signature.

OTTO F. ROHWEDDER.